United States Patent

[11] 3,564,973

| [72] | Inventors | Ronald Leonard Archibald Bushey; Reginald Arthur Haygreen, London, England |
|---|---|---|
| [21] | Appl. No. | 834,082 |
| [22] | Filed | June 17, 1969 |
| [45] | Patented | Feb. 23, 1971 |
| [73] | Assignee | Staveley Machine Tools Limited |

[54] POT BROACHING MACHINE HAVING WORK CLAMPING MEANS
5 Claims, 6 Drawing Figs.

[52] U.S. Cl. .................................................... 90/88
[51] Int. Cl. .................................................... B23d 41/06
[50] Field of Search .......................................... 90/87, 88, 89, 90, 63, 76, 77

[56] References Cited
UNITED STATES PATENTS

| 2,372,823 | 4/1945 | Gotberg ...................... | 90/63X |
| 2,530,066 | 11/1950 | Laase ........................... | 90/88X |

Primary Examiner—Gil Weidenfeld
Attorney—Roberts, Cushman and Grover

ABSTRACT: A machine for broaching the periphery of a gear or other centrally apertured component in one vertical stroke of an internally contoured broaching tool, in which the component is seated upon the upper end of a vertical supporting member which is movable axially to clamp the component against the lower end of a vertical locating member and is rotatable about its axis to lock the supporting and locating members together through the aperture in the component during the working stroke of the tool.

POT BROACHING MACHINE HAVING WORK CLAMPING MEANS

This invention relates to machines for broaching the peripheries of gears, splines and other centrally-apertured components, of the kind comprising a fixed base, a hollow internally toothed or otherwise contoured broaching tool mounted for vertical movement relative to the base and means mounted on the base for positioning and supporting a component to be broached in the path of vertical movement of the broaching tool.

A principal object of the invention is to provide a machine of the kind described with improved means for accurately locating and supporting a component to be broached during the working stroke of the broaching tool and to this end, according to the invention, there is provided an elongated supporting member formed at its upper end with a seat for a component to be broached, an elongated locating member mounted above and coaxial with said supporting member, means for moving said supporting member vertically relatively to said base and said locating member to raise a component supported thereby into engagement with the lower end of said locating member, means for rotating said supporting member about its axis relative to said base and said locating member and cooperating means on said supporting and locating members operable upon rotation of said supporting member in its raised position to lock said members together in clamping engagement with a component.

Vertical movement of the supporting member and the broaching tool is preferably effected by hydraulic fluid under pressure supplied to cylinders mounted on said base and containing pistons connected to the lower end of the supporting member and the upper end of a slide carrying the broaching tool respectively, and the two cylinders are interconnected hydraulically during the working stroke of the tool.

A preferred embodiment of the invention will be described by way of example, with reference to the accompanying drawings, in which.

Figure 1:
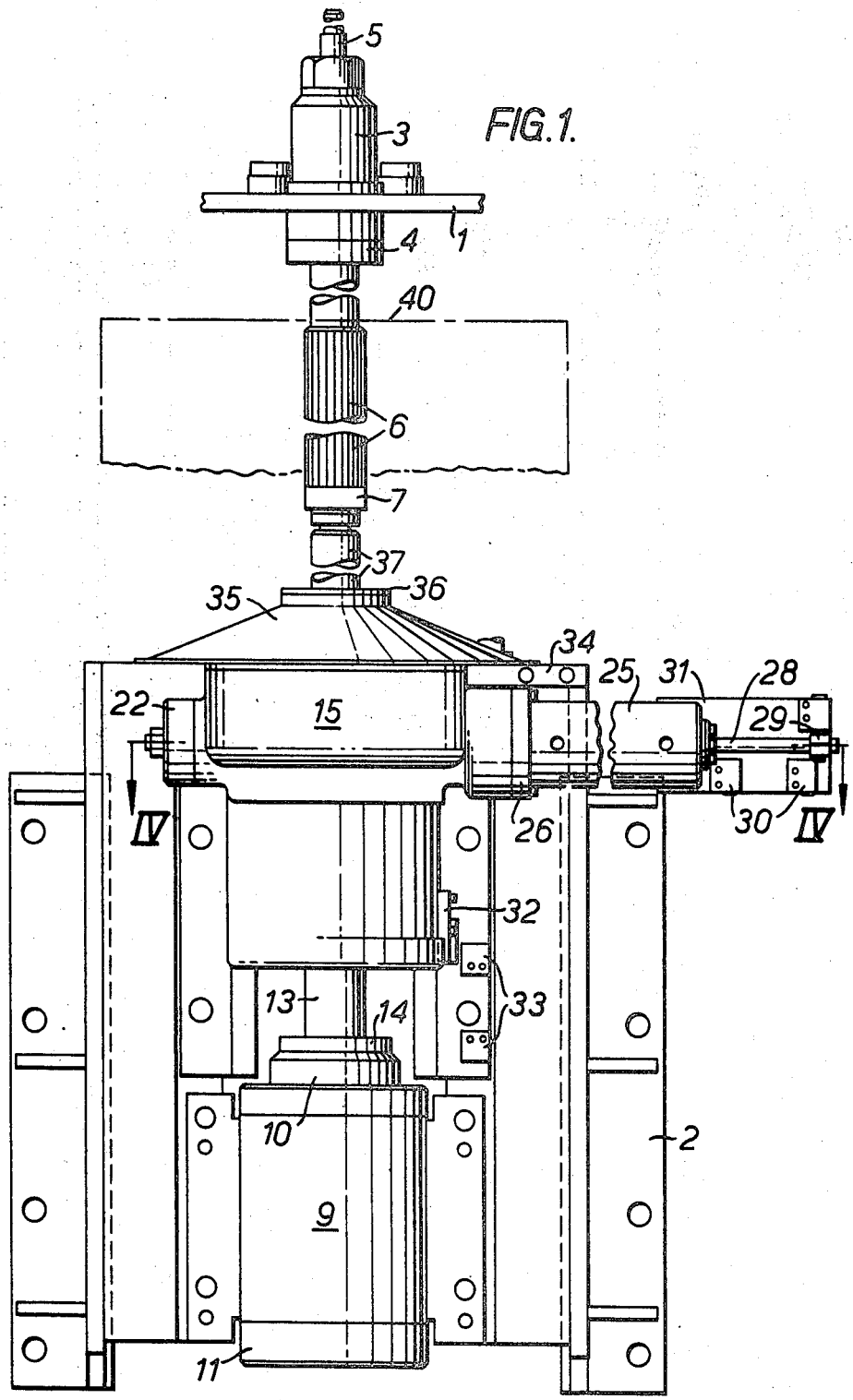
FIG. 1 is an elevation with parts broken away, of the component locating and supporting means mounted on a machine frame with part of a broaching tool represented in broken lines.
Figure 2:
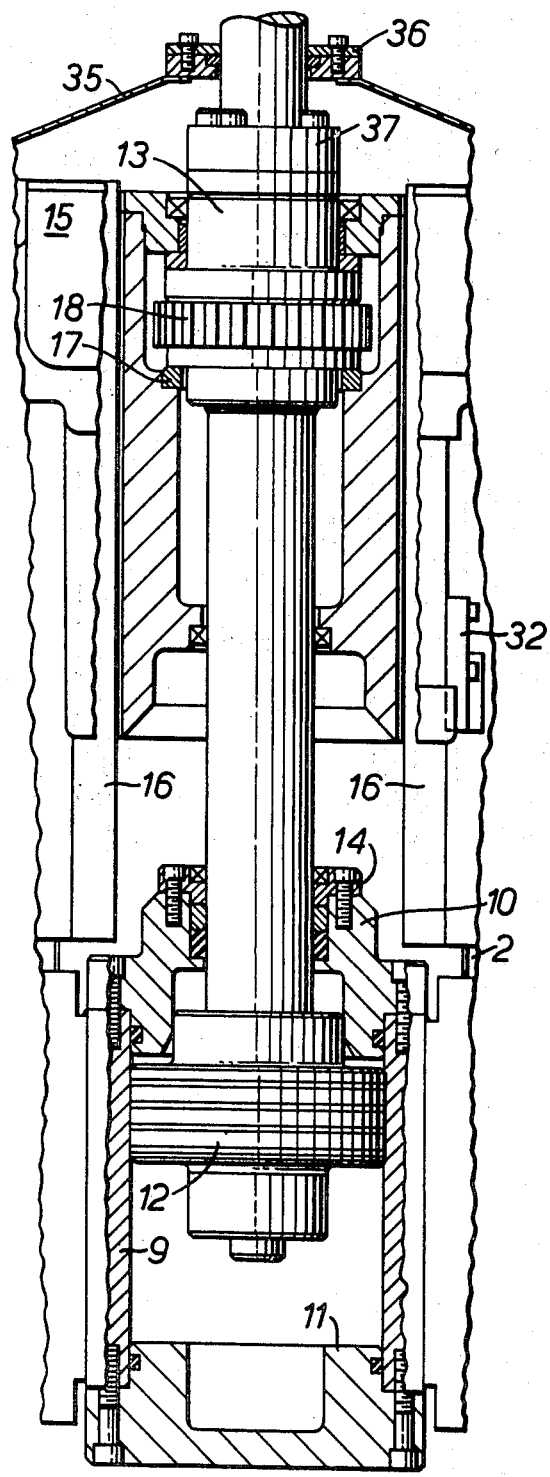
FIG. 2 is a part-sectional elevation, on an enlarged scale, showing the lower part of the component supporting means.
Figure 3:
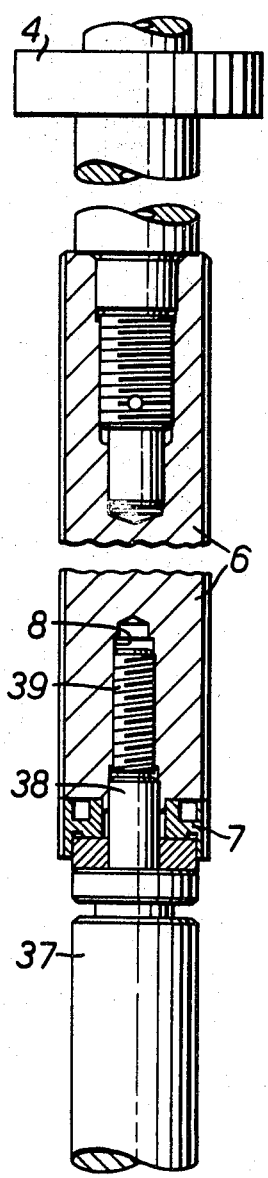
FIG. 3 is a part-sectional elevation, on an enlarged scale, with parts broken away, showing a component clamped between the supporting and locating means.
Figure 4:
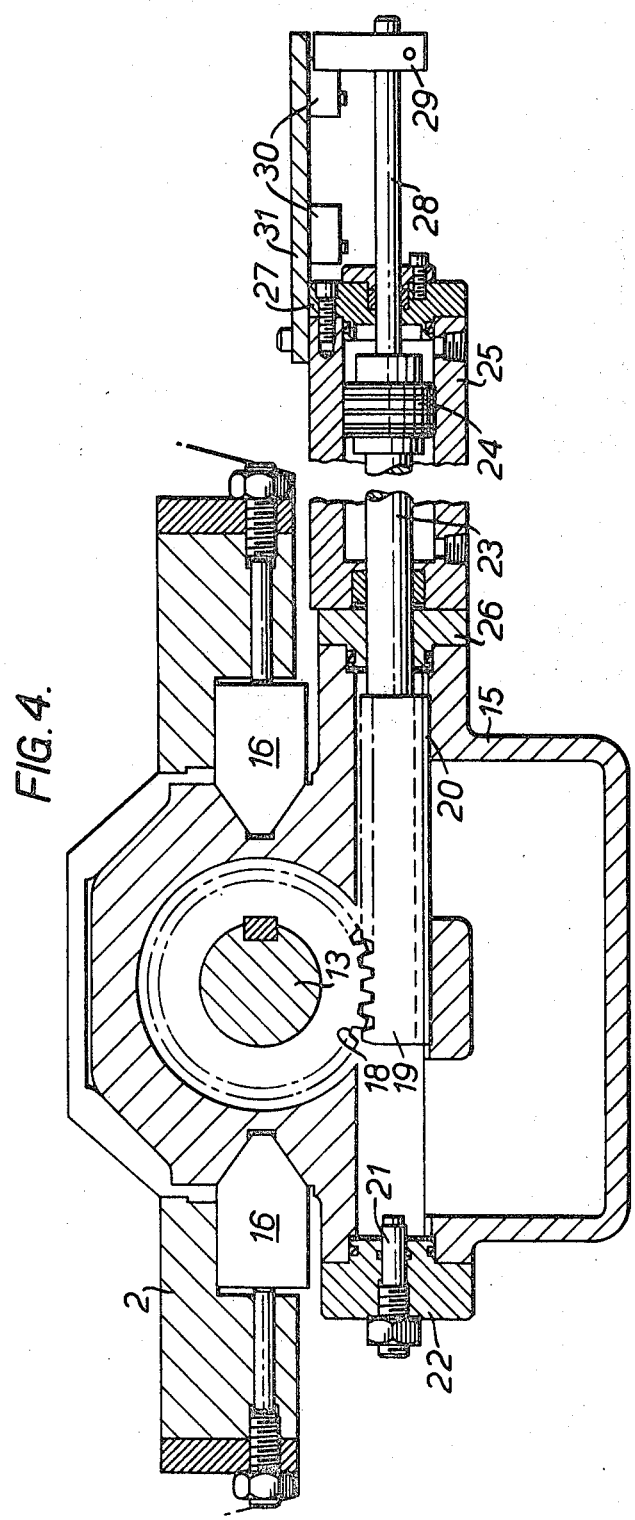
FIG. 4 is an enlarged section on the line IV—IV of FIG. 1.
Figure 6:
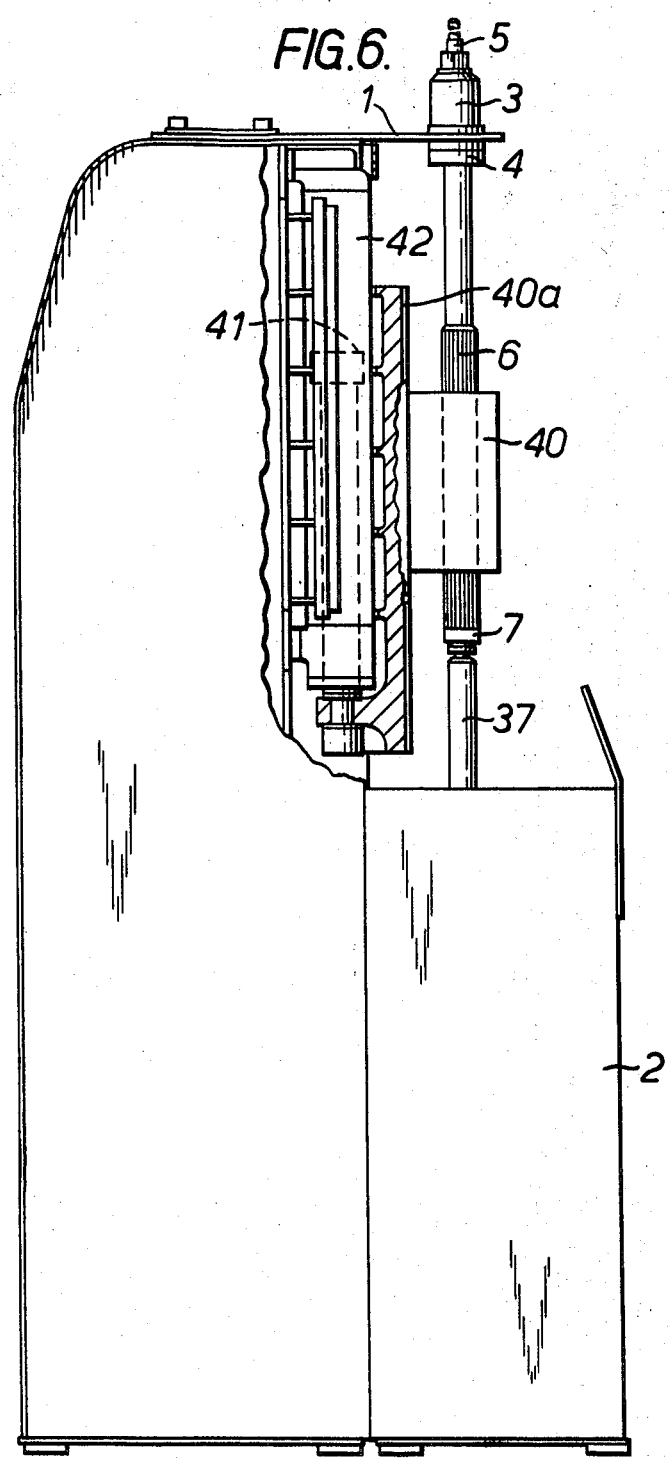
FIG. 6 is a side elevation on a reduced scale of a complete machine, with part of the casing broken away to show the connection between the tool and its operating means.

The machine shown in the drawings has an upper supporting frame 1, a part of which is shown in FIGS. 1 and 6, and a lower supporting frame 2. Secured to the upper frame 1 by means of a nut 3 is an upper clamping shaft 4 through which passes a coolant feed tube 5. The lower end of the shaft 4 is secured to the upper end of a locating member 6 the lower end of which is adapted to be engaged by the upper surface of a component 7 to be broached and is provided with a blind bore 8 (FIG. 3) formed with an internal quick-acting thread. The lower supporting frame 2 carries a cylinder 9 closed at its ends by upper and lower caps 10 and 11 and containing a piston 12 (FIG. 2), the rod 13 of which extends in fluid-tight manner through the upper cap 10 and a gland ring 14 into a gear case 15 which is axially movable with the piston rod along ways 16 (FIG. 4) adjustably mounted on the frame 2. The piston rod 13 is rotatably mounted in bearings 17 (FIG. 2) in the gear case 15 and has keyed thereto a pinion gear 18 which meshes with a rack 19 (FIG. 4) keyed at 20 to the gear case for transverse movement relative thereto, to an extent determined by the engagement of one end thereof with an adjustable stop 21 mounted in an end cap 22 on the gear case. The other end of the rack 19 is secured to one end of a rod 23, the other end of which is secured to a piston 24 contained in a cylinder 25 closed at one end by a cap 26 which also forms an end cap for the gear case 15 and is apertured for the passage of the rod 23. The other end of the cylinder 25 is closed by a cap 27 which is apertured for the passage of a rod 28 secured at one end to the piston 24 and at the other end to an activator 29 which cooperates with sensing devices 30 secured to a plate 31 projecting from one end of the cylinder, to control the supply of hydraulic fluid under pressure to the cylinder. The gear case 15 also carries an operating block 32 (FIG. 1) which cooperates with sensing devices 33 on the frame 2 to control the supply of hydraulic fluid under pressure to the cylinder 9. The degree of movement of the piston 12 in the downward direction is limited by its engagement with the end cap 11 and by engagement of the gear case 15 with the end cap 10 of the cylinder 9 and in the upward direction by engagement of the gear case with a stop block 34 (FIG. 1) secured to the frame 2 immediately below a guard 35. The latter is provided with a cap 36 which is apertured for the passage of a lower clamping shaft 37 secured at its lower end to the piston rod 13 and adapted at its upper end to engage the lower surface of a component 7 to be broached. Projecting from the upper end of the shaft 37 is a pin 38 (FIG. 3) which is adapted to pass through the central aperture in a component 7 seated on the shaft 37 into the blind bore 8 in the locating member 6 and is formed with an external quick-acting thread 39 which is adapted to cooperate with the thread in the bore to lock the shaft to the locating member upon rotation of the former relative to the latter.

A hollow internally-toothed broaching tool 40 (FIGS. 1 and 6), is secured, in axial alignment with the member 6 and shaft 37, to a tool slide 40a which is reciprocable vertically relative to the fixed frames 1 and 2 by hydraulic fluid pressure applied to a piston 41 (FIG. 5), of greater diameter than the piston 12, contained in a cylinder 42. The broaching tool 40 is of conventional form having a longitudinal series of sets of internal cutting teeth which slide in longitudinal grooves in the outer surface of the member 6 and are arranged to progressively form the desired external configuration on a component 7 in a single downward stroke of the tool.

Figure 5:
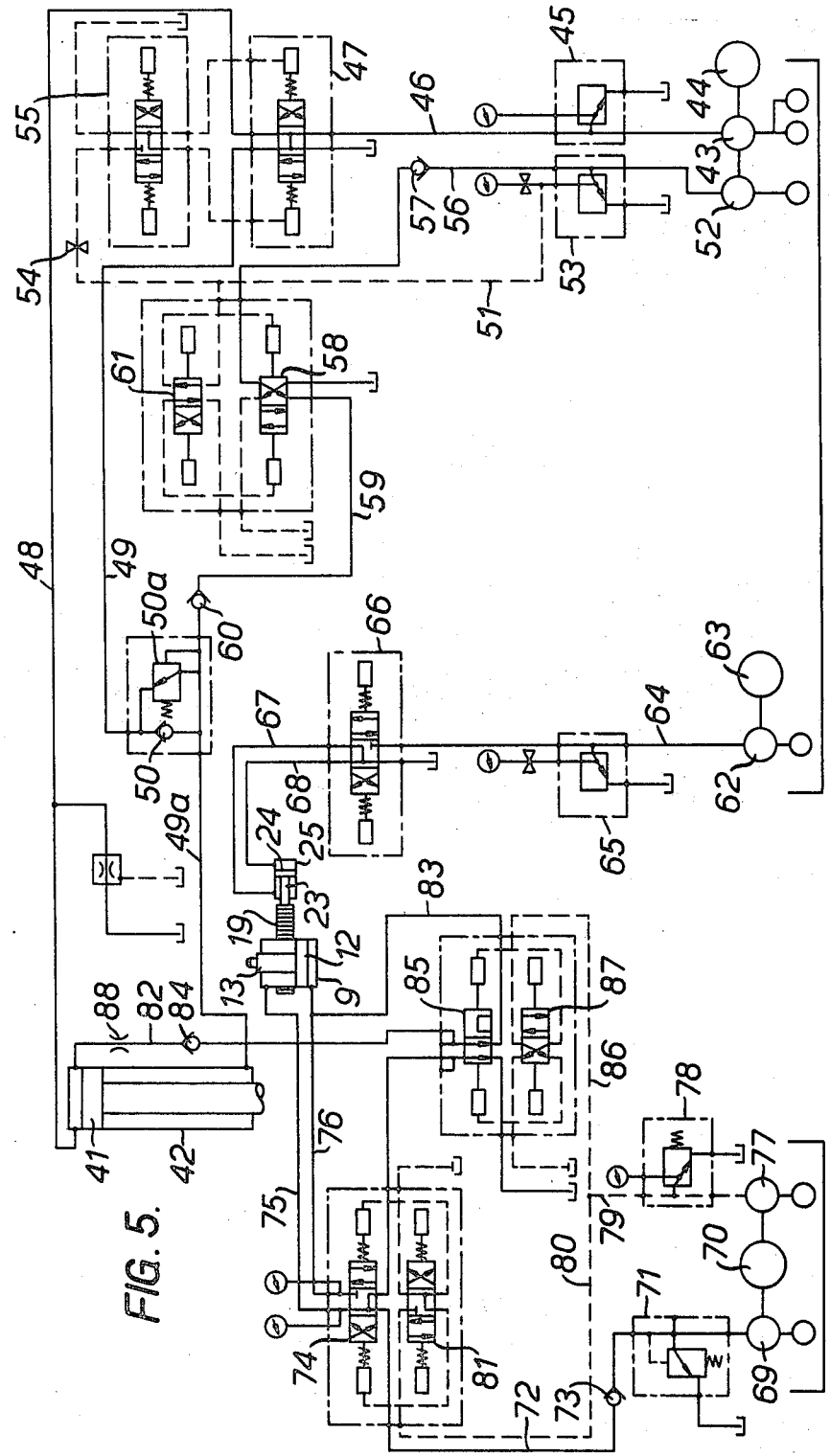
FIG. 5 is a diagrammatic representation of a hydraulic operating circuit for the machine shown in FIGS. 1 to 4.

Referring to FIG. 5 of the drawings, a pump 43 driven by an electric motor 44 delivers fluid, at a pressure controlled by a relief valve 45, through a line 46 to a four-way spool valve 47 which is connected to the upper end of the cylinder 42 through a line 48 and to the lower end of the cylinder 42 through a line 49 and a line 49a connected to the line 49 through a nonreturn valve 50 and a pressure-operated valve 50a in parallel. The valve 47 is operated by pressure fluid, delivered through a line 51 by a pump 52 driven by the motor 44, at a pressure controlled by a relief valve 53 and a fine control valve 54, to a solenoid-operated valve 55 which directs the fluid to one or other end of the valve 47. The pump 52 also delivers fluid through a line 56 containing a nonreturn valve 57 to a four-way valve 58 connected through a line 59 containing a nonreturn valve 60 to the line 49a and the valve 50a. The valve 58 is operated by fluid from the pump 52 flowing through the line 51 to a solenoid-operated valve 61 which directs the fluid to either end of the valve 58. A third pump 62 driven by an electric motor 63 delivers fluid through a line 64, at a pressure controlled by a relief valve 65, to a solenoid-operated four-way valve 66 connected to the cylinder 25 on opposite sides of the piston 24 by lines 67 and 68 respectively. A fourth pump 69 driven by an electric motor 70 delivers fluid, at a pressure controlled by a relief valve 71, through a line 72 containing a nonreturn valve 73 to a four-way valve 74 connected to the cylinder 9 on opposite sides of the piston 12 through lines 75 and 76 respectively. The valve 74 is operated by fluid delivered by a pump 77, driven by the electric motor 70, at a pressure controlled by a relief valve 78, through lines 79 and 80 to a solenoid-operated valve 81 which directs the fluid to one or other end of the valve 74. The upper end of the cylinder 42 is also connected to the lower end of the cylinder 9 through lines 82 and 83, a restrictor 88, a nonreturn valve 84 and a four-way valve 85, which latter is operated by pressure fluid from the pump 77 flowing through line 79 and a line 86 to a solenoid-operated valve 87 which directs the fluid to one or other end of the valve 85.

In the inoperative condition of the machine, the piston 12, piston rod 13, gear case 15 and clamping shaft 37 are in their lowered positions leaving a gap between the lower end of the locating member 6 and the upper end of the clamping shaft 37. The piston 41 and broaching tool 40 are in their raised positions and the piston 24 and rack 19 are in their extreme right-hand positions as looked at in the drawings. A component 7 to be broached is placed upon the upper end of the shaft 37 with the pin 38 projecting through its central aperture. The valve 81 is moved into a position to connect the pump 77 to the left-hand end of valve 74 to move the latter into a position connecting the line 72 to the line 76. Fluid at a pressure of up to 300 p.s.i. is then delivered by the pump 69 to the lower end of the cylinder 9 to raise the piston 12, rod 13, gear case 15 and clamping shaft 37 until the pin 38 thereon enters the bore 8 in the locating member 6. The valve 66 is then operated to connect the line 64 to the line 68 and fluid at a pressure of up to 450 p.s.i. is delivered by the pump 62 to the right-hand end of cylinder 25 to move the piston 24, rod 23 and rack 19 to the left to rotate the pinion gear 18, piston rod 13 and clamping shaft 37 in a clockwise direction as looked at in FIG. 4, relative to the locating member 6 to lock the shaft 37 thereto through the medium of the matching quick-acting threads thereon. The valve 55 is then operated to connect the pump 52 to the left-hand end of valve 47 to move the latter to the right and thus connect the line 46 to the line 48. Fluid at a pressure of up to 750 p.s.i. is then delivered by the pump 44 to the upper end of the cylinder 42 to effect the downward working stroke of the tool 40 through the medium of the piston 41. At the same time the valve 87 is operated to connect the pump 77 to the left-hand end of the valve 85 to permit fluid from the upper end of the cylinder 42 to flow to the lower end of the cylinder 9 through lines 82 and 83. The piston 12, being of smaller diameter than the piston 41, provides an upward thrust to the component 7 of approximately 70 percent of the cutting load. This automatically balances out for a light or heavy cut and thus results in only 30 percent of the cutting load being applied to the component locking mechanism as a tensile load. Therefore, a large component needing a heavy cutting load can have a small center hole without the load causing stretching of the quick-acting thread mechanism.

At the end of the working stroke, the valve 55 is again operated to connect the pump 52 to the other end of the valve 55 to move it into a position in which the upper end of the cylinder 42 is connected to exhaust and the lower end is connected to the pump 44 from which fluid is supplied to return the tool 40 to its uppermost position. The valve 66 is then operated to connect the right-hand end of cylinder 25 to exhaust and the opposite end to the pump 62 whereby the rack 19 is operative to rotate the pinion gear 18 an anticlockwise direction, as viewed in FIG. 4, and thus disengage the shaft 37 from the locating member 6. Finally the valve 81 is operated to connect the pump 77 to the opposite end of the valve 74 which is then shifted to connect the lower end of the cylinder 9 to exhaust and the upper end to the pump 69 to lower the shaft 37 and permit the machined component to be removed therefrom.

We claim:

1. A machine for broaching the periphery of a gear or other centrally apertured component, comprising a fixed base a hollow internally-contoured broaching tool mounted on said base and connected to means for moving it vertically relative to said base, and means mounted on said base for locating and supporting a component in the path of vertical movement of said broaching tool, said locating and supporting means comprising an elongated supporting member formed at its upper end with a seat for a component, an elongated locating member mounted above and coaxial with said supporting member, means for moving said supporting member vertically relative to said base and said locating member to raise a component supported thereby into engagement with the lower end of said locating member, means for rotating said supporting member about its axis relative to said base and said locating member and cooperating means on said supporting and locating members operable, upon rotation of said supporting member in its raised position, to lock said members together in clamping engagement with a component.

2. A machine according to claim 1, wherein said cooperating means comprise an external quick-acting thread on a pin projecting axially from the upper end of said supporting member and adapted to pass through the central aperture in a component mounted thereon and an internal quick-acting thread on the wall of an axial bore formed in the lower end of said locating member and adapted to receive said pin.

3. A machine according to claim 1, wherein the lower end of said supporting member is operatively connected to a piston movable vertically in a cylinder mounted on the lower part of said base and means are provided for selectively connecting the upper and lower ends of said cylinder to a source of hydraulic fluid under pressure.

4. A machine according to claim 3, wherein the upper end of said broaching tool is operatively connected to a piston, of greater diameter than the piston connected to said supporting member, movable vertically in a cylinder mounted on the upper part of said base, means being provided for selectively connecting the upper and lower ends of said latter cylinder to a source of hydraulic fluid under a greater pressure than said first-mentioned source and further means being provided for connecting the upper end of said tool cylinder to the lower end of said support cylinder during the working stroke of said tool.

5. A machine according to claim 1, wherein said supporting member carries a pinion gear which meshes with a rack mounted in a gear case movable vertically with said supporting member, said rack being moveable horizontally relative to said gear case by hydraulic fluid pressure selectively supplied to opposite sides of a piston connected to said rack and acting in a cylinder secured to said gear case.